Figure 1:
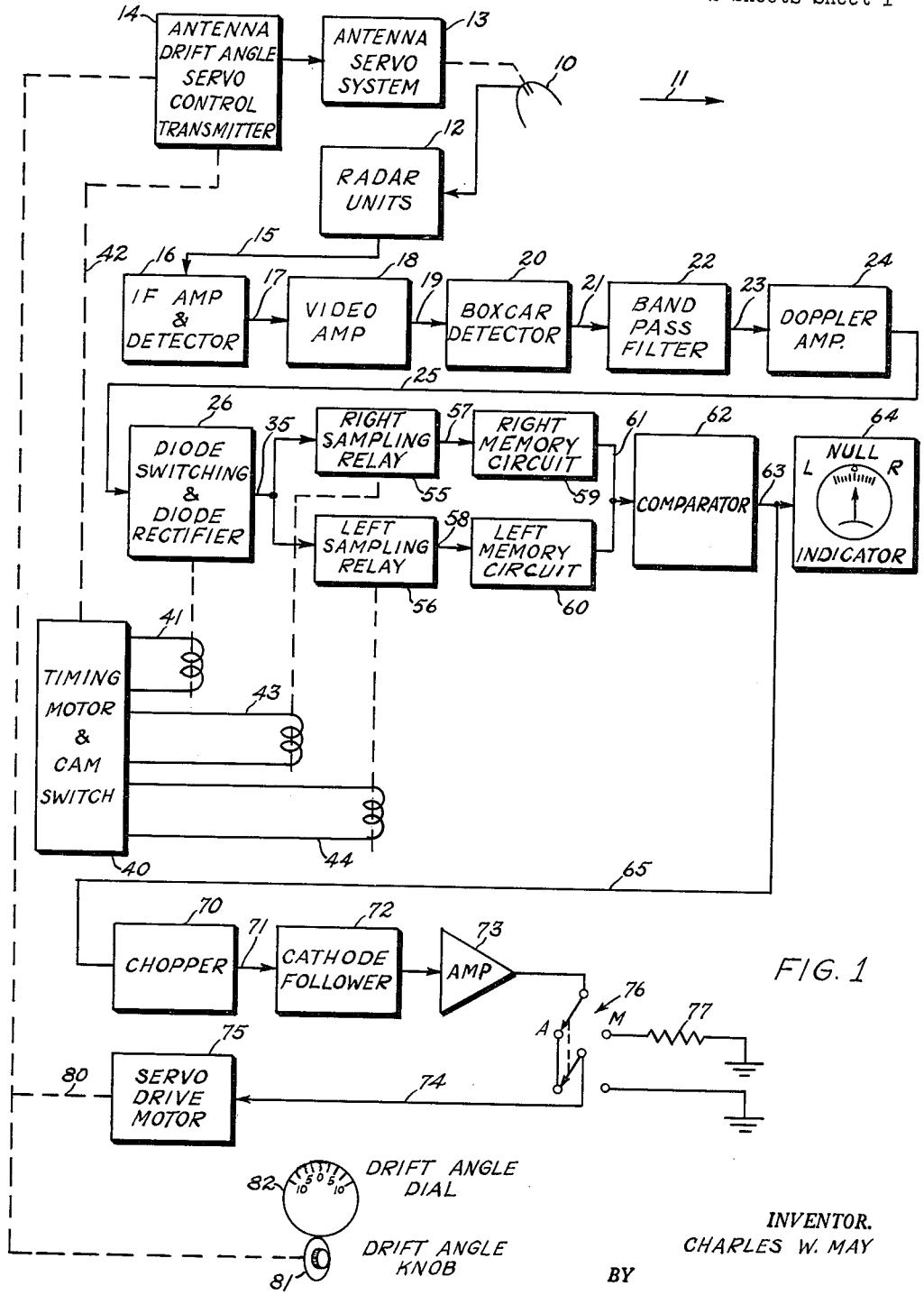

June 16, 1964  C. W. MAY  3,137,848
DRIFT ANGLE COMPUTER
Filed July 27, 1960  2 Sheets-Sheet 2

INVENTOR.
CHARLES W. MAY
BY
H. H. Loscke
ATTORNEYS

United States Patent Office 3,137,848
Patented June 16, 1964

3,137,848
DRIFT ANGLE COMPUTER
Charles W. May, Lawrence, Ind., assignor to the United States of America as represented by the Secretary of the Navy
Filed July 27, 1960, Ser. No. 45,767
12 Claims. (Cl. 343—7.4)
(Granted under Title 35, U.S. Code (1952), sec. 266)

The invention described herein may be manufactured and used by or for the Government of the United States of America for governmental purposes without the payment of any royalties thereon or therefor.

This invention relates to aircraft drift angle computers and more particularly to radar responsive aircraft drift angle determination which is automatic and continuous to provide indications of drift between the longitudinal reference line of an aircraft and ground track to the aircraft destination.

The uncertainty of wind, as it changes in velocity and direction from time to time, from place to place, and from one altitude to another, has been a major hindrance to the dependable navigation of aircraft since the Wright brothers made their first flight at Kittyhawk. The problem is further complicated for military aircraft, which may be required to fly long distances without radio communication or radio navigational aids. Landmarks may be obscured by darkness or weather conditions, and are nonexistent over water. The effect of wind on the flight path of an aircraft could be compensated for if it could be measured conveniently. If correct drift angle could be obtained, a pilot could fly a direct course over a ground track to his destination.

The time-honored method of navigation is to obtain the magnitude and direction of the wind from the most reliable source available, and use this information to plot a new heading which is supposed to compensate for the effect of wind. To be at all reliable, this method requires periodic radio contact with a source of weather information; and even then the inherent limitations of time lag and variations in wind with altitude and location can introduce large errors. Such systems have the disadvantage that whenever errors in flight path are produced by drift a new ground tract must be established from the aircraft to the destination and that large drift angle errors occur because accuracy cannot be accomplished by periodic checks. There are several existing Doppler navigational systems presently used which may be of the pulsed or continuous-wave (CW) radar variety. These Doppler navigational systems for producing drift angle employ at least two separate radio or radar beams radiated toward the earth substantially at equal angles from ground track, and the echo signals are compared to produce error signals which will be indicative of the drift or error of the aircraft from its proper ground course. The pilot can continuously redirect the aircraft to follow the proper ground track although drift angle is introduced into the navigation of the aircraft by the wind. These systems are cumbersome in that they require two antenna systems.

The drift angle computer of this invention provides a continuous indication of the effect of wind on the heading of the aircraft permitting the pilot to offset his heading the correct amount to stay on course of the original ground track. In the present invention a single radar beam of a conventional radar of the pulse type is used, and the antenna thereof is driven in oscillations producing a center of oscillation coincident in direction with the ground track. The echo signals received back are gated and sampled for consideration of only the extreme end limits of the transmit-receive left and right half-cycle positions of the antenna, this gating being synchronized with antenna operation. The drift angle computer of this invention further gates the echo signals from the left extremity of antenna oscillation into a left sampling circuit, and the echo signals received from the right extremity of antenna oscillation are gated into a right sampling circuit and the outputs of the sampling circuits are compared to produce an error signal, if any, representative of the deviation of aircraft flight path from the designated ground track. This error signal is used to automatically shift the center of oscillation of the antenna to nullify the error signal, which degree of shift of the center of oscillation of the antenna from the longitudinal center-line of the aircraft will produce the drift angle of the aircraft from its ground track. The continuous drift angle indications enable the pilot to maintain the aircraft on course over ground track whereby the shortest course to destination will be followed. The error signal producing the drift angle could likewise be used in conjunction with the automatic pilot of an aircraft whereby the aircraft will be automatically directed to maintain a drift angle, although varying, to maintain a course over ground track. It is therefore a general object of this invention to provide a continuously operating drift angle computer for aircraft utilizing a single air-to-ground radar developing an echo intermodulated Doppler spectrum to establish drift angle errors.

Figure 2:
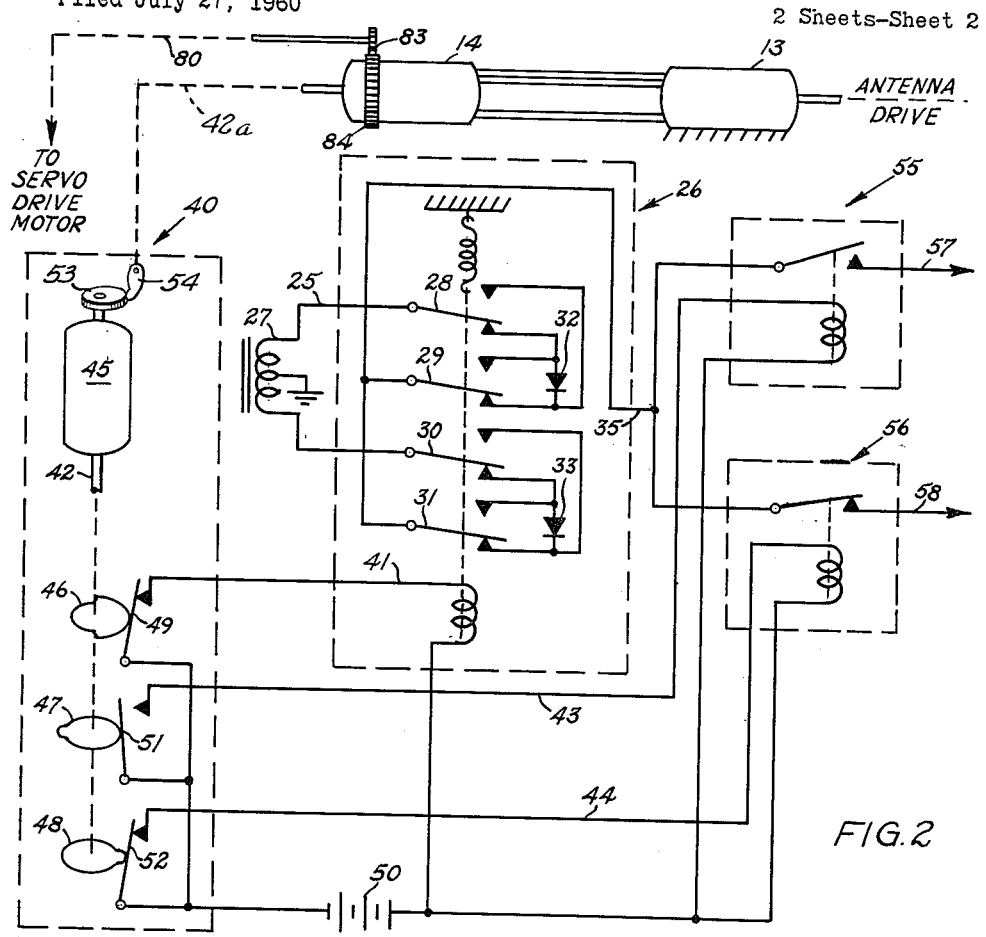
Figure 3:
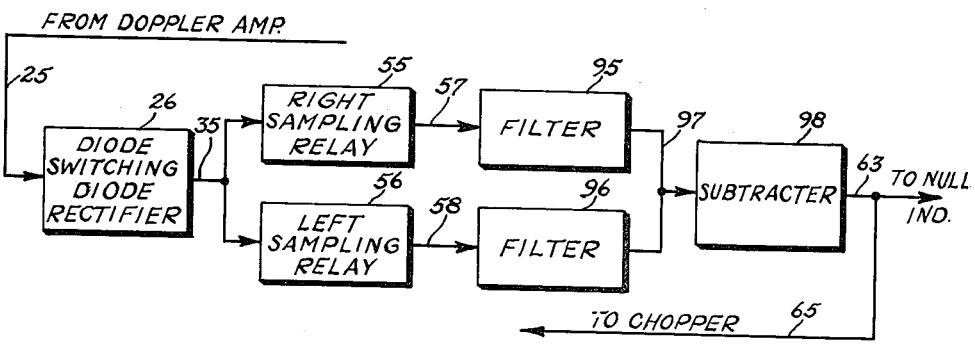

These and other objects and the attendant advantages, features, and uses of the drift angle computer will become more apparent as the description proceeds when considered along with the accompanying drawings in which:

FIGURE 1 illustrates in block circuit diagram a drift angle computer system of this invention, FIGURE 2 illustrates a partly in block circuit diagram and partly in mechanical elevations the gating and antenna servo motor system used in this invention, and FIGURE 3 illustrates one modification in block circuit diagram of the sampling circuit channels shown in FIGURE 1.

Referring more particularly to FIGURE 1, a radar system of the air-to-ground radar type carried in a vehicle such as an aircraft illustrates the antenna at 10 and shown as being directed forwardly and downwardly from an aircraft (not shown) progressing in the direction of the arrow 11. Reference character 12 illustrates in block the radar units such as a transmitter and a receiver as well understood by those skilled in the radar art. It is preferable that a radar be used having a pencil antenna beam rather than a cosecant squared beam, although one with a cosecant squared beam could be used in which case it would not be necessary to establish a depression angle of the antenna. The antenna 10 is mechanically driven in oscillations over a full angle of about 10° by an antenna servo motor system 13 constituting a servo receiver motor operating in conjunction with an antenna drift angle servo control transmitter 14. The operation of the servo system 13, 14 will be more fully described in the description of FIGURE 2 and will not be described further in connection with FIGURE 1.

Echo signals received by the radar receiver in the radar units 12 will be conducted by the conductor means 15 to an intermediate frequency (IF) amplifier and detector circuit 16 the output of which produce video signals on the conductor means 17. These echo signals are amplified in the video amplifier 18 and are conducted by way of the conductor means 19 to a boxcar detector 20 to produce a complex waveform which defines a Doppler spectrum. The Doppler spectrum is conducted by way of conductor means 21 through a bandpass filter 22 and the filtered spectrum conducted by conductor means 23 through a Doppler amplifier 24 over a conductor means 25 to a diode switching and rectifier circuit 26.

The function and operation of the diode switching rectifier circuit 26 will be more fully described in the description of FIGURE 2, but for the purpose of the description of FIGURE 1 let it be understood that the portion of echo signal that is passed by component 22 and applied by way of the component 26 is rectified to produce a voltage signal of an amplitude proportional to the change in the filtered spectrum from 22 and the rectified signal voltage is switched to pass to the output 35 by a switching circuit therein under the control of a timing motor and cam switching means 40. Energization of this switch in the component 26 is by way of the relay circuit 41 and energization of this relay circuit 41 is synchronized in time to permit those echo signals to pass through component 26 when the antenna 10 is in either of its half cycles including the extreme right or left extremity of oscillation. Synchronization is accomplished by virtue of the timing motor in the timing means 40 being coupled through shafting or other means 42 and 42a to the rotor of the servo control transmitter 14 in the antenna drift angle servo system. When the component 26 is switched to pass echo signals over the right half-cycle of oscillation of the antenna 10, the rectified signal voltage thereof is allowed to pass through a right sampling relay 55 by virtue of gating relay energization through the relay circuit 43 switched by the switching circuits in the timing motor and cam switch means 40. In like manner the rectified signal voltage of the echo signals passed by the component 26, when the antenna is in its left half-cycle of oscillation, will be gated to pass through the left sampling relay circuit 56 under the energization control of circuit 44 from the cam switches in the component 40. Each of the sampled voltages are coupled by way of the conductor means 57 and 58 to right and left memory circuits 59 and 60, respectively. The outputs of the right and left memory circuits 59 and 60 are applied by way of conductor means 61 to a comparator circuit 62 for producing an error voltage from the right and left memory circuit voltages on the output 63 of the comparator. Comparator 62 may be of any well-known circuit design to add signals of unlike polarity and subtract signals of like polarity, or otherwise compare, direct current voltages to produce a resultant voltage herein constituting the error voltage. If the echo signals gated and sampled at the right and left extremities of antenna oscillation are of equivalent frequency, the rectified signal voltages applied on the output 35 of the component 26 will be equal whereupon the output error voltage on the conductor means 63 will be zero. The error voltage existent on the output 63 is applied to a null indicator 64 which will indicate the existence of an error voltage in amplitude and polarity or a null voltage. The null indicator 64 may have legends thereon to indicate whether or not drift is to the right or to the left of the center of oscillation of the antenna 10 by virtue of the polarity of the error signal and the degree of drift will be indicated by virtue of the amplitude of the error signal. From this indication the pilot could redirect the aircraft to null this indication which would direct the aircraft over the prescribed ground track to destination. The null indicator 64, however, does not indicate the drift angle at which the aircraft is proceeding along ground track.

Error signals on the output 63 of comparator 62 are branch coupled by way of the conductor means 65 through a chopper circuit 70 of any known and conventional type. This chopped voltage is applied by way of conductor means 71 through a cathode follower tube circuit 72 and an amplifier 73 by way of conductor means 74 to control the drive and directional rotation of a servo drive motor 75. The conductor means 74 has a switch 76 therein which in its A position, or automatic position, produces an unbroken circuit from the amplifier 73 to the servo drive motor 75. When switch 76 is thrown to the manual position, M, the amplifier 73 is coupled through a dummy load 77 to ground. The dummy load 77 may be any impedance matching the impedance of the servo drive motor and is herein shown as a resistor. The input conductor 74 to the servo drive motor 75 is coupled directly to ground—to ground out residual currents thereby avoiding any shift or creep in the servo drive motor 75. The cathode follower 72 and the servo amplifier 73 may be of any of the conventional and well-known types and will not be further described herein since they are well-known components in the art.

The servo drive motor 75 is mechanically coupled to drive by way of shafting 80, or other equivalent means, a drift angle knob 81 and also the stator of the servo control transmitter of the servo systems 13, 14 driving the antenna 10. The drift angle knob 81 is mechanically coupled as by gears, threads, chains, or other equivalent means to a drift angle dial 82 which has indicia thereon indicating drift angle in degrees, right or left, of the deviation of the antenna center of oscillation from the longitudinal center line or reference line of the aircraft carrying the radar and drift angle equipment. As drift angle is changed by virtue of the drift angle computer operating through the above described circuitry to maintain the null indicator 64 in a null position this drift angle dial 82 will continuously indicate the degrees of drift of the longitudinal center line of the aircraft from its prescribed ground track. Whenever it is desirable to manually change the drift angle, switch 76 may be thrown to the position M and the drift angle knob 81 rotated manually to change the drift angle.

Referring more particularly to FIGURE 2 wherein like reference characters are used to identify like parts with those of FIGURE 1, the gating circuitry and synchronizing servo motor driving means are shown in block circuit and elevational diagram. The timing motor and cam switch means 40 are shown within broken lines. This means consists of a timing motor 45 having the shaft or equivalent means 42 driving through an eccentric cam 53 and cam follower 54 on the rotor shaft 42a of the servo control transmitter 14 to impart an oscillatory rotary motion thereto although any suitable and well-known means of converting rotary motion to oscillatory rotary motion may be used. The timing motor 45 has a continuation of the shaft 42 as a double ended motor on which are mounted cam discs 46, 47, and 48. The cam disc 46 has a high cam surface for 180° and a low cam surface for the remaining 180° which cam surfaces are operative to open and close the switch 49 in the relay circuit 41 in the diode switching component 26 through a voltage source 50. The switch 49 is shown closed by the high cam surface which energizes the relay switch in the component 26, soon to be described. Cam disc 47 has one cam lobe in the radial position coincident with the center of the low cam surface on the cam disc 46, the cam lobe on the cam disc 47 being in a position away from a switch 51 in circuit through the relay circuit 43 to the right sampling relay 55 which leaves relay 55 in an unenergized position. The cam disc 48 has a single cam lobe thereon in a radial position coinciding with the center of the high cam surface on the cam disc 46. This high cam surface on cam disc 46 closes switch 49 and at the same time the cam lobe on cam disc 48 closes switch 52 to energize the relay circuit 44 to close the relay switch 56 of the left sampling relay circuit. As may be realized from this description, as the timing motor 45 is driven in rotation, the rotor of the servo control transmitter 14 is driven in an oscillatory rotary motion which produces a corresponding electromagnetic field rotation in the antenna servo drive motor 13 driving the antenna in oscillations which is synchronized with the cam switches 46, 47, and 48. As cam disc 46 is rotated engaging the switch blade 49 to close this switch for 180° and to open this switch for 180°, switches 52 and 51 will be closed in exact sequence, respectively, with the switch 49 operation. In the position of the cam switches shown in FIGURE 2 the timing motor 45 has driven the servo transmitter 14 rotor to produce rotor rotation in the servo drive motor 13 to drive the antenna to its extreme left limit of oscillation. When the drive motor 45 has rotated its shaft 42 180°, the antenna should be in the extreme right limit of oscillation at which time switch 49 will be open and switch 51 will be closed, relay switch 55 will be closed, and relay switch 56 opened.

The echo signals coming from the Doppler amplifier 24 by way of conductor means 25 are applied to the diode switching and rectifier circuit 26 as hereinabove described, this conductor means 25 being shown herein as coupled to the Doppler amplifier by coupling transformer 27. A center tap of the coupling transformer 27 is connected directly to ground and the opposite leads of the transformer 27 secondary are coupled to switch blades 28 and 30. Switch blades 29 and 31 are coupled to the output conductor 35. The four switch blades 28 through 31 are driven in unison by the relay control circuit 41. The switch blades 28 through 31 are each alternately seated between contacts coupling rectifiers 32 and 33. Switch blades 28 and 29 co-operate with contacts coupling rectifier 32 and switch blades 30 and 31 co-operate between contacts coupling the rectifier 33. Since the two rectifier circuits are identical, only one will be described herein. Referring more particularly to the rectifier circuit 32, the upper contact for switch blade 28 and the lower contact for switch blade 29 are coupled to the cathode of rectifier 32 while the lower contact for switch blade 28 and the upper contact for switch blade 29 are coupled to the anode of the rectifier 32. By this arrangement upon energization of the relay circuit 41, the contacts will be pulled downwardly as shown in FIGURE 2 and the Doppler signal spectrum applied through the transformer 27 over the conductor means 25 will be conducted through switch blade 28, anode, and cathode of rectifier 32 in that order and switch blade 29 to the output 35, and in the same direction through the rectifier 33, providing full wave positive rectification of the echo signal. These rectified echo signals are gated to pass only when sampling relay 56 is closed. When the relay circuit 41 is de-energized, echo signals will be rectified in full wave in the opposite polarity and gated through the sampling relay 55 when closed. If any error voltages resulting in the difference in magnitude of the sampled and stored voltages are applied to the servo drive motor 75, servo drive motor 75 will be driven in a direction depending on the polarity of the error signal to rotate shaft 80 or other equivalent means to drive the stator of servo control transmitter 14. This driving means is illustrated in FIGURE 2 by the shafting 80 driving a pinion gear or equivalent means 83 in co-operative mesh or other driving relation with an annular gear 84 affixed to the stator of the servo control transmitter 14. Any rotation of the stator of the servo control transmitter 14 will change the stator-rotor relationship in the transmitter 14 and in like manner the stator-rotor relationship in the servo receiver 13 to shift the center of oscillation of the antenna from the output shaft of the servo receiver 13. In this manner the antenna is driven to oscillate a given angle, such as 5°, on opposite sides of the center of oscillation by gearing or other means (not shown) well within the skill and understanding of those skilled in the art and this center of oscillation of the antenna may be changed by shifting the stator of the servo transmitter 14.

In the operation of this device let it be assumed that the drift angle computer together with the radar units 12 and antenna 10 of a radar system are mounted in an aircraft traveling in the direction of the arrow 11. The antenna 10 oscillates right and left of a center of oscillation forwardly and downwardly of the aircraft to illuminate ground surface with transmitted signals. The ground surface normally has projections or terrain which will produce "scatterers" which reflect a substantial part of the radar signals as echo signals to the radar receiver in the radar units 12. Due to the motion of the aircraft each "scatterer" will produce energy that undergoes Doppler shift. The combination of these will produce an intermodulated Doppler spectrum received as echo signals. The intermodulated Doppler spectrum is applied through the components 16 to 24, inclusive, all of which are of conventional structure and well-known design to produce amplified echo signals on the output 25 to the diode switching and rectifier circuit 26. The echo signals are gated to pass rectified signal voltages to the right sampling relay circuit 55 and memory circuit 59 when the antenna 10 is at its right extreme of oscillation and this rectified signal is memorized in the memory circuit 59 until a sample is taken and applied to the sample and memory circuits 56 and 60 when the antenna 10 is in its left extreme of oscillation. These two rectified echo signal voltages are compared in the comparator circuit 62 and their sum and difference taken to produce an error signal on the output 63. If the direct current voltages in the memory circuits 59 and 60 are equal, no error voltage will appear on the output 63 and the null indicator will indicate zero. A null indication indicates that the aircraft is properly pursuing the prescribed ground track to destination without deviation. As the error signal appears on the output 63 the null indicator will indicate the voltage amplitude and polarity of this error signal, the polarity indicating whether or not the aircraft is deviating right or left from its prescribed ground track and the amplitude of this error signal indicating the degree of deviation of the aircraft from its prescribed ground track. If switch 76 is in its automatic or A position, the servo drive motor 75 will be energized to drive in a direction to change the center of oscillation of antenna 12 to coincide with that of ground track. The angular difference between the antenna center of oscillation and the longitudinal reference or center line of the aircraft will be the drift angle of the aircraft and this drift angle will be registered on the drift angle dial 82. Since air currents change or vary, the drift angle dial will not be expected to remain steady but will vary in accordance with these wind changes and correction is made by the drift angle computer system herein described. As may be seen from the above description the drift angle computer of this invention continuously measures drift angle without reliance upon periodic checks with known radio weather reporting stations for visible ground object or known points on the surface of the earth. This drift angle computer enables a pilot to fly over the prescribed ground track substantially eliminating any deviations therefrom until destination is reached.

Referring more particularly to FIGURE 3 wherein like reference characters are applied to like components and elements as shown in FIGURES 1 and 2, a block circuit diagram is shown for a modification of the memory and comparator circuits shown in FIGURE 1. In this modification the rectified signal voltages applied to the right and left sampling circuits 55 and 56 are applied through conductor means 57 and 58 to corresponding filter circuits 95 and 96 the outputs of which are applied through the conductor means 97 to a subtractor circuit 98. This subtractor circuit 98 will again produce error signals which are applicable through the conductor means 63 to the null indicator 64 and the branch conductor means 65 to the chopper circuit 70 as hereinabove described for FIGURE 1. The operation of FIGURE 1 with the modification as shown by FIGURE 3 is substantially unchanged from that described in the description of operation hereinabove.

While many modifications and changes may be made in the constructional features and components as hereinabove shown and described with equivalent circuits or components, it is to be understood that I desire to protect my invention and the spirit of my combination as set forth by the scope of the appended claims.

I claim:
1. A drift angle correction system for use with a radar comprising: a radar transmitter and receiver system adapted to be carried by a vehicle with an antenna driven to oscillate about a small azimuthal angular path in a downwardly direction to illuminate ground areas; gating means to gate echo signals for each right of center and left of center travel of antenna oscillation; sampling means for sampling the echo signals at the right and left extremities of antenna travel and for developing an error signal therefrom; antenna positioning means coupled to said antenna for positioning the center of oscillation of said antenna; and means coupling said error signal to said antenna positioning means to position said center of oscillation of said antenna to nullify said error signal.

2. A drift angle computer for use with a radar comprising: a radar transmitter and receiver system adapted to be carried by an aircraft with an antenna driven to oscillate about a small azimuthal angular path in a downwardly direction to illuminate ground area; means gating echo signals for each right of center and left of center travel of antenna oscillation; means sampling the echo signals from the right and left extremities of antenna travel and developing an error signal therefrom; antenna positioning means coupled to said antenna for positioning the center of oscillation thereof; means coupling said error signal to said antenna positioning means to control same to position said center of oscillation of said antenna to nullify said right and left sampled echo signals; and means coupled to said coupling means for indicating the deviations of said center of oscillation from a predetermined reference.

3. A drift angle computer as set forth in claim 2 wherein said means gating and sampling echo signals for sampling echo signals at the right and left extremities of antenna oscillation are switching means synchronized in operation with said antenna positioning means.

4. A drift angle computer as set forth in claim 3 wherein said antenna positioning means is a servo transmitter and receiver system, said servo receiver being coupled to drive said antenna, and said switching means is a timing motor operative to drive cam operated switches in a sequence for gating and sampling echo signals and coupled to said servo transmitter for synchronization of said switches with antenna positions.

5. A drift angle computer for use with a radar comprising: a radar transmitter and receiver system including an antenna for transmitting radar signals and for receiving echo signals, said system adapted to be carried by a vehicle, and said antenna driven to oscillate about a small azimuthal angular path across a center of oscillation to illuminate ground areas in oscillatory paths normal to the path of travel of said vehicle and to said center of oscillation; gating means coupled to said radar receiver for gating received echo signals for each right and left travel condition of antenna oscillation; sampling means coupled to said gating means to sample each right and left echo signal at the extremities of antenna travel; combining means coupling said sampling means for combining said right and left echo signals to produce error signals therefrom; positioning means coupled to the antenna driving means to position said center of oscillation of said antenna, said positioning means being coupled to receive said error signals to position said center of oscillation of said antenna to null said error signals; indicator means coupled to said combining means to indicate existant error signals; and measurement means coupled to said positioning means to measure angular deviations between said center of oscillations of said antenna and the path of travel of said vehicle whereby drift angle of a carrying vehicle is computed.

6. A drift angle computer as set forth in claim 5 wherein said positioning means is a motive means responsive to said error signals to automatically drive said antenna driving means, and said positioning means includes selectably suitable manual means to be alternatively useable with said automatic motive drive means.

7. A drift angle computer as set forth in claim 6 wherein said antenna driven to oscillate is driven by an antenna servo receiver drive motor driven in accordance with signals from an antenna servo transmitter having two positionable elements therein, and said motive means responsive to said error signals is coupled to drive one positionable element of said antenna servo transmitter for positioning said center of antenna oscillation, and said gating means includes a timing motor driving the other positionable element of said antenna servo transmitter for oscillating said antenna over said center of oscillation.

8. A drift angle computer as set forth in claim 7 wherein said gating means includes a rectifier circuit coupling said radar receiver to a branch circuit coupling right and left sampling circuits, said sampling circuit outputs being coupled to said combining means, and each said rectifier circuit and sampling circuit being switched by a relay under energization control by said timing motor, said timing motor energizing said relay in said rectifier circuit to close said relay contacts for each right oscillation travel of said antenna and to open said relay contacts for each left oscillation travel of said antenna, energizing said relay in said right sampling circuit to close the contacts thereof when said antenna is at its right extremity of oscillation, and energizing said relay in said left sampling circuit to close the contacts thereof when said antenna is at its left extremity of oscillation whereby antenna operation and echo signal sampling is synchronized.

9. A drift angle computer for utilizing the intermodulated Doppler spectrum created from radar reflected signals comprising: a radar transmitter and receiver system including an antenna for transmitting radar signals and for receiving echo signals, said system adapted to be carried by an aircraft and said antenna having servo driving means to oscillate same about a small azimuthal angle across a center of oscillation forward and downward of the aircraft to illuminate a ground path along the line of flight; a servo control transmitter coupled to said antenna servo receiver driving means to cause said antenna servo receiver driving means to drive in accordance with said servo control transmitter rotor and stator positions; a timing motive means coupled to the rotor of said servo control transmitter to drive same in oscillatory rotary motion and coupled to actuate electrical switches; gating means coupled to said radar receiver for gating received echo signals for each right and left travel of antenna oscillation, said gating means being gated by said actuated switches; sampling means coupled to said gating means to sample the echo signals at each said right and left extremity of antenna travel; combining means coupled to said sampling means for combining said right and left sampled echo signals into an error signal; drift angle drive means coupled to said combining means and responsive to said error signal and coupled to said servo control transmitter stator to drive same in a direction to change the center of oscillation of said antenna to reduce said error signal to zero; and indicating means coupled to said combining means to indicate the state of drift angle whereby the antenna center of oscillation is corrected for drift angles of said aircraft with respect to the aircraft longitudinal centerline.

10. A drift angle computer as set forth in claim 9 wherein said gating means includes three relay electrical switches controlled in energization by said timing motive means electrical switches, the first of which gates the echo signals in reversed polarity for each right and left half-cycle travel of antenna oscillation, respectively, the second of which samples the echo signal at the right extremity of antenna oscillation gated by said first relay electrical switch for said right sampling means, and the third of which samples the echo signal at the left extremity of antenna oscillation gated by said first relay electrical switch for said left sampling means whereby said gating and sampling means are synchronized in operation with said antenna oscillations and extremities of half-cycle travel.

11. A drift angle computer as set forth in claim 10 wherein said gating means includes a rectifier for rectification of said echo signals and for polarizing same respectively for right and left antena half-cycle travel positions for said sampling means, said indicating means includes a null meter coupled to said combining means to indicate the polarity and amplitude of said error signals, and a drift angle indicator coupled to be driven by said drift angle drive means to indicate the drift angle deviation of said antenna center of oscillation from said aircraft longitudinal center line.

12. A drift angle computer as set forth in claim 11 wherein said error signal is chopped and amplified in said coupling from said combining means to said drift angle drive means with means therein to place a fixed potential on said drift angle drive means, and said coupling of said drift angle drive means and said combining means includes a disabling switch and a manual means for manually adjusting the drift angle when said disabling switch is switched to disable said drift angle drive means.

References Cited in the file of this patent

UNITED STATES PATENTS

| | | |
|---|---|---|
| 2,589,813 | Hulsizer | Mar. 18, 1952 |
| 2,853,700 | Cherry | Sept. 23, 1958 |
| 2,855,590 | Gray | Oct. 7, 1958 |
| 2,869,118 | Tull et al. | Jan. 13, 1959 |